(12) United States Patent
Sviberg

(10) Patent No.: US 10,857,865 B2
(45) Date of Patent: Dec. 8, 2020

(54) TOP HAVING A LOADING AID FUNCTION AND CONVERTIBLE VEHICLE HAVING SUCH A TOP

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 28 days.

(21) Appl. No.: 16/261,120

(22) Filed: Jan. 29, 2019

(65) Prior Publication Data

US 2019/0241052 A1  Aug. 8, 2019

(30) Foreign Application Priority Data

Feb. 5, 2018 (DE) .......... 10 2018 102 520
Jul. 6, 2018 (DE) .......... 10 2018 116 377

(51) Int. Cl.
*B60J 7/12* (2006.01)
*B60J 7/16* (2006.01)
*B60J 7/185* (2006.01)

(52) U.S. Cl.
CPC ............ *B60J 7/1265* (2013.01); *B60J 7/126* (2013.01); *B60J 7/1692* (2013.01); *B60J 7/1855* (2013.01)

(58) Field of Classification Search
CPC ......... B60J 7/1265; B60J 7/1856; B60J 7/126
USPC .. 296/107.01, 109, 120.1, 121, 122, 107.09, 296/107.12
See application file for complete search history.

(56) References Cited

U.S. PATENT DOCUMENTS 8,287,027 B2 * 10/2012 Wilke .................... B60J 7/1265
                                                 296/107.09
2013/0334836 A1 * 12/2013 Braun .................... B60J 7/1226
                                                 296/107.09

* cited by examiner

*Primary Examiner* — Dennis H Pedder
(74) *Attorney, Agent, or Firm* — Fitch, Even, Tabin & Flannery, LLP

(57) ABSTRACT

A top for a convertible vehicle, having a top cover and a top linkage which can be displaced between a covering position and a storage position, in which the vehicle interior is open at the top, and which may have a link assembly on either side of a vertical longitudinal center plane of the top, the top linkage having a corner bow which extends in the transverse direction of the vehicle and which defines an area of transition of the top cover between a roof portion and a rear portion when the top linkage is in the covering position. When the top linkage is in the covering position, the corner bow is secured against pivoting by means of at least one blocking element disposed on a pivoting part of the top linkage and can be displaced from the covering position into a loading position by displacing the pivoting part.

7 Claims, 12 Drawing Sheets

TOP HAVING A LOADING AID FUNCTION AND CONVERTIBLE VEHICLE HAVING SUCH A TOP

CROSS-REFERENCE TO RELATED APPLICATIONS

This application claims priority from German Patent Application Number DE 10 2018 102 520.3, filed Feb. 5, 2018, and German Patent Application Number DE 10 2018 116 377.0, filed Jul. 6, 2018, which is hereby incorporated herein by reference in its entirety for all purposes.

FIELD

The invention relates to a top for a convertible vehicle having the features of the preamble of claim 1 and to a convertible vehicle having such a top.

BACKGROUND

A top which is displaceable between a covering position, in which a vehicle interior is covered, and a storage position, in which the vehicle interior is open at the top, is known from practice. For stretching a top cover, said top has a top linkage which comprises a link assembly on either side of a vertical longitudinal center plane of the vehicle, each link assembly being mounted on a vehicle-attached main bearing. Moreover, it is known for the top linkage to have a corner bow which extends in the transverse direction of the vehicle and which defines an area of transition of the top cover between a roof portion and a rear portion. In order for the corner bow not to be unintentionally displaced when the top is in the covering position, it is secured by means of belts and/or locks. When the top is to be displaced into a loading position, in which a cargo space of a vehicle is made accessible, the belts or locks need to be opened.

SUMMARY

The object of the invention is to provide a top of the kind mentioned above which can easily be displaced into a loading position and to provide a convertible vehicle having such a top.

According to the invention, said object is attained by the top having the features of claim 1 and by the convertible vehicle having the features of claim 1.

Therefore, according to the invention, a convertible top is proposed which comprises a top cover and a top linkage which can be displaced between a covering position, in which a vehicle interior is covered, and a storage position, in which the vehicle interior is open at the top (i.e. is uncovered). The top linkage comprises a link assembly on either side of a vertical longitudinal center plane of the vehicle and a corner bow extending in the transverse direction of the vehicle. When the top linkage is in the covering position, the corner bow defines an area of transition of the top cover between a roof portion and a rear portion, which can include a rear window. When the top linkage is in the covering position, the corner bow is secured against pivoting by means of at least one blocking element disposed on a pivoting part of the top linkage. By displacing the pivoting part, the corner bow can be displaced from the covering position into a loading position, in which a cargo space of the vehicle is more easily accessible.

In the top according to the invention, no additional mechanisms such as belts and/or locks that would have to be opened in order to release the corner bow are needed owing to the corner bow being secured by the blocking element disposed on the pivoting part. Instead, the corner bow of the proposed top is automatically released by displacement of the pivoting part.

In a specific embodiment of the top according to the invention, the pivoting part is a tensioning bow which surrounds the vehicle interior at the rear and which is pivotably mounted on a vehicle-attached main bearing on either side of a vertical longitudinal center plane of the vehicle.

In a preferred embodiment of the top according to the invention, the tensioning bow is secured against pivoting when the top linkage is in the covering position. In this way, the corner bow is additionally secured.

A blocking element can be disposed on the tensioning bow on either side of the vertical longitudinal center plane of the vehicle. In particular, the blocking elements can each be disposed on a side of a leg of the tensioning bow that faces the vehicle interior, said leg of the tensioning bow extending in the longitudinal direction of the vehicle when the top linkage is in the covering position.

In a preferred embodiment of the top according to the invention, the blocking element is a stop element, which is a separate element and, for example, attached to the tensioning bow.

In a specific embodiment of the top according to the invention, displacement into the loading position takes place manually. In particular, first the pivoting part is displaced manually, whereby the corner bow is released. Then, the corner bow can be manually displaced into the loading position, whereby accessibility of a cargo space of the vehicle is improved.

In a preferred embodiment of the top according to the invention, the top comprises a driving element, in particular a gas pressure spring, which aids displacement of the top linkage.

The driving element can engage a main link of the top linkage and can be supported on the respective main bearing in attachment to the vehicle. Also, the driving element can serve as a driving unit in a first partial phase of displacement and as a damping device in a second partial phase of displacement.

According to another aspect, a convertible vehicle comprising a top of the kind described above is proposed. The convertible vehicle is an off-road vehicle or a sports utility vehicle, for example.

An embodiment of a convertible vehicle having a top according to the invention is illustrated in the drawing in a schematically simplified manner and will be explained in more detail in the following description.

DETAILED DESCRIPTION

Figure 1:
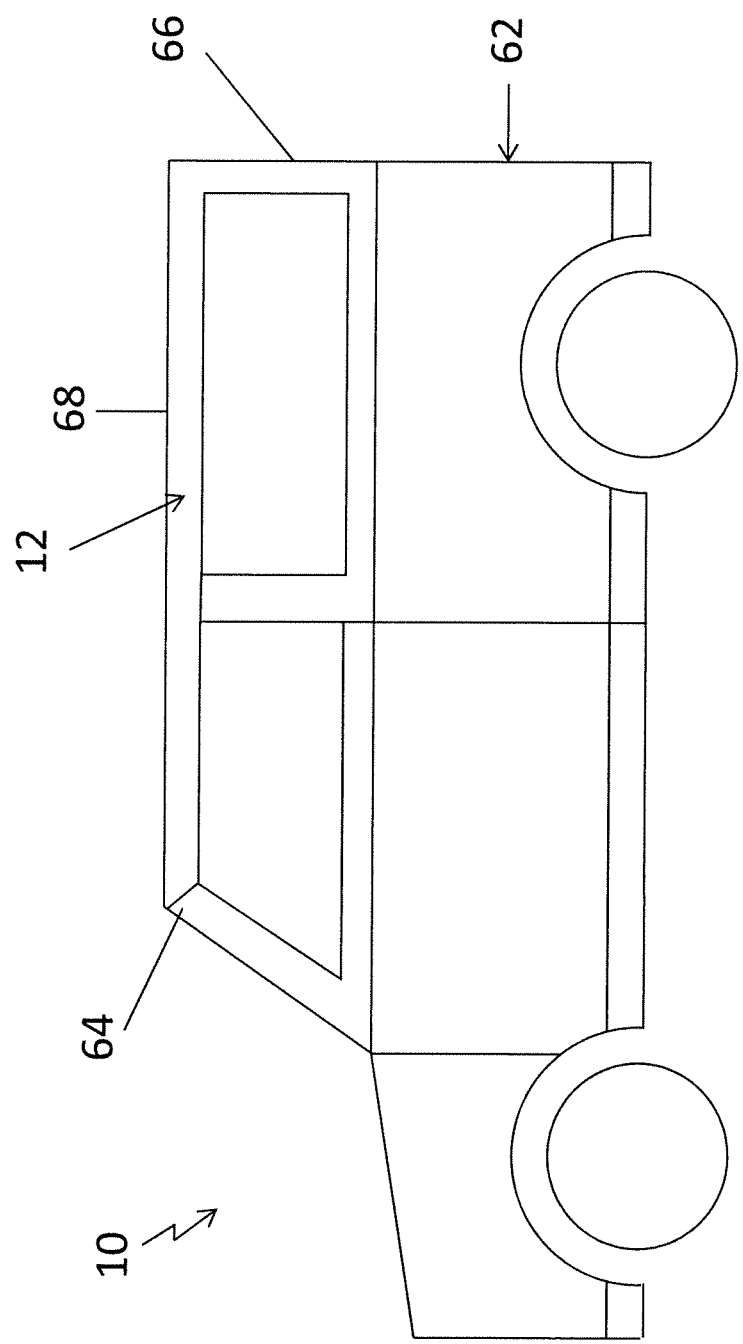
FIG. 1 is a schematic side view of a convertible vehicle realized as an off-road vehicle with a top in a covering position.
Figure 2:
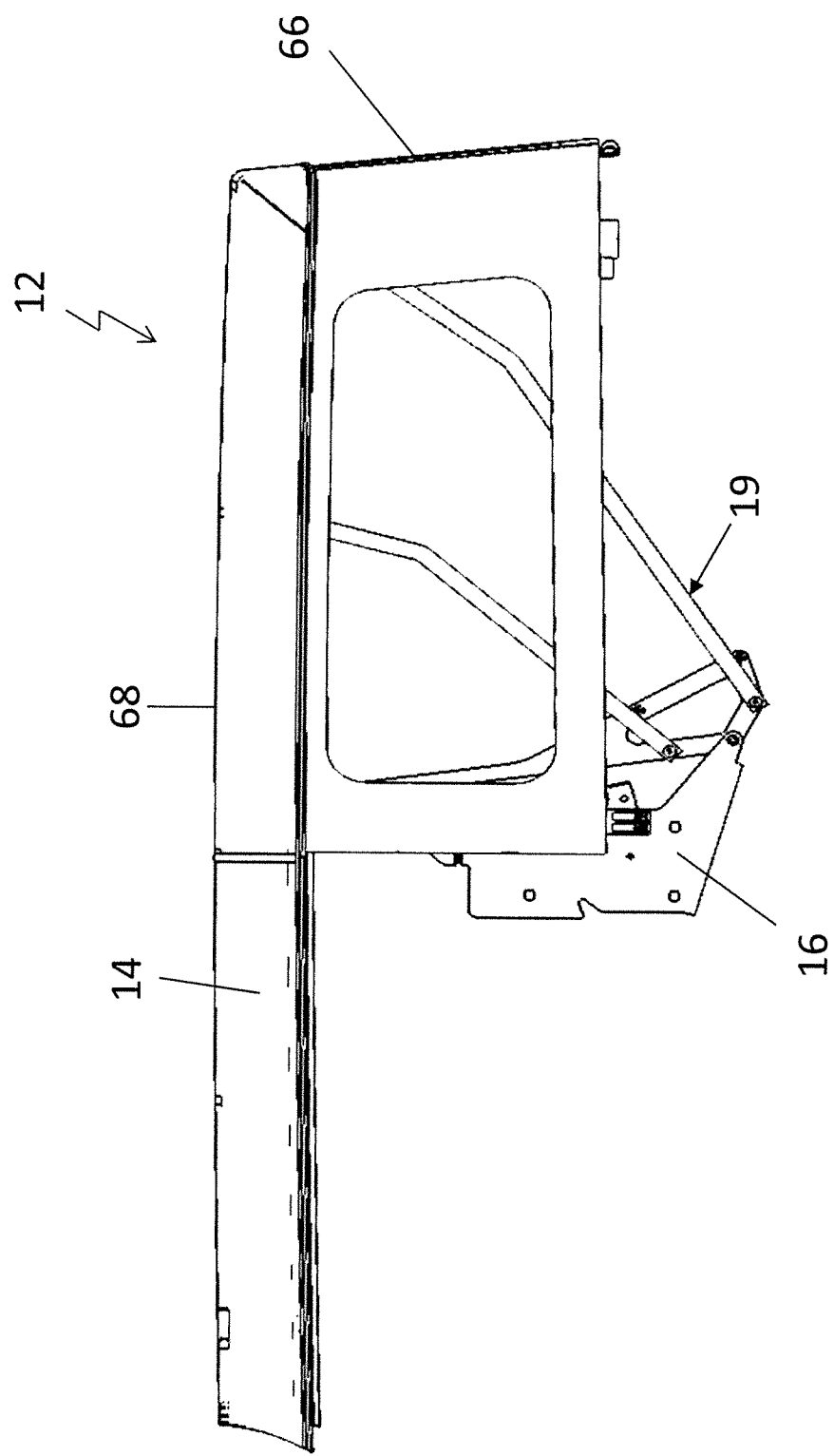
FIG. 2 is a side view of the top together with a rear side window in the covering position.
Figure 3:
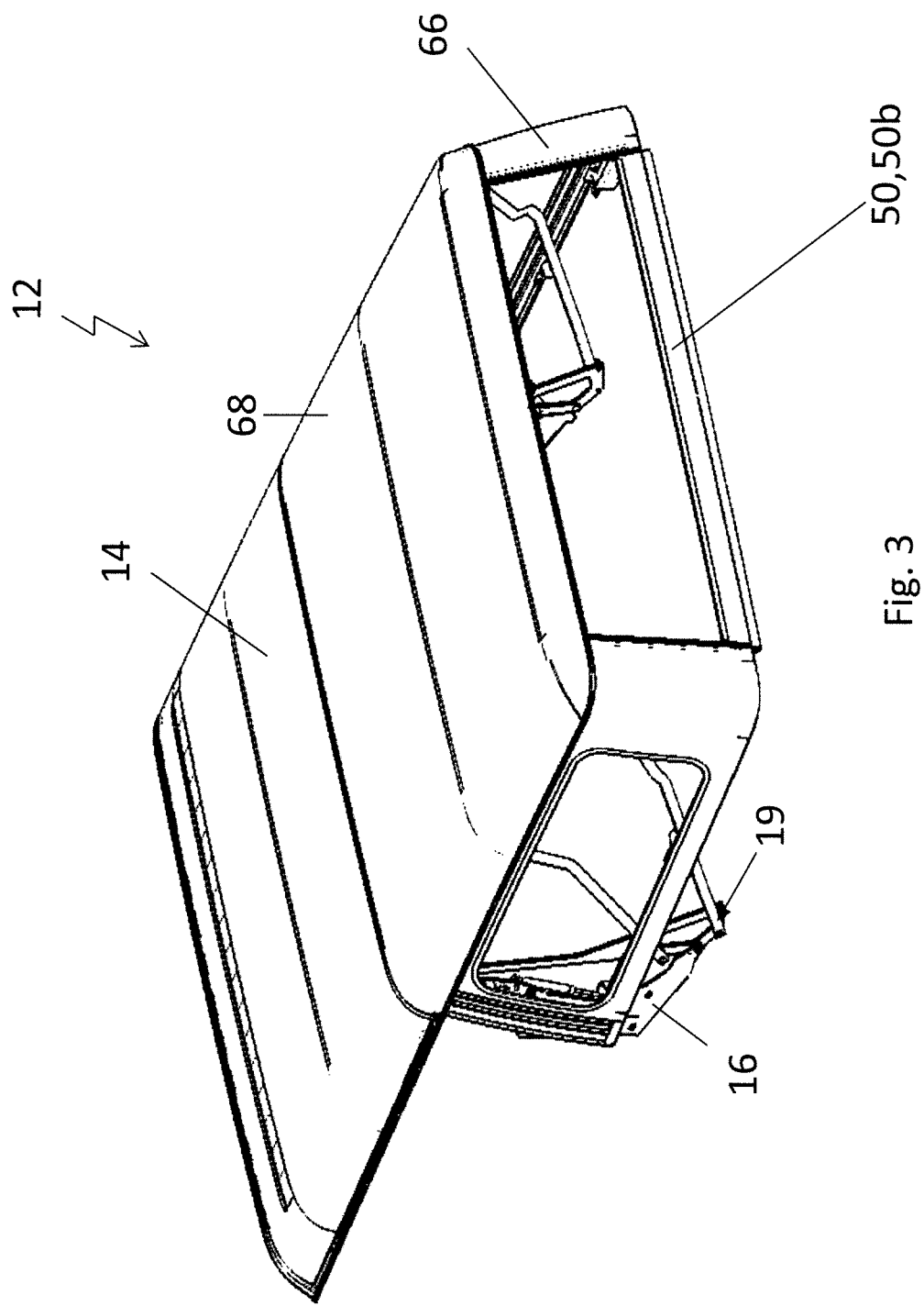
FIG. 3 is a perspective view of the top of FIG. 2 in the covering position.

FIG. 1 shows a convertible vehicle 10 which is an off-road vehicle. Convertible vehicle 10 comprises a vehicle body 62, which surrounds a vehicle interior, and a displaceable top 12. When in a covering position, which is illustrated in FIGS. 1, 2, 3 and 5 and in which the vehicle interior is covered, top 12, which is a folding top, extends from a front header 64, which forms an upper leg of a windshield frame extending in the transverse direction of the vehicle, into a rear portion 66.

Figure 4:
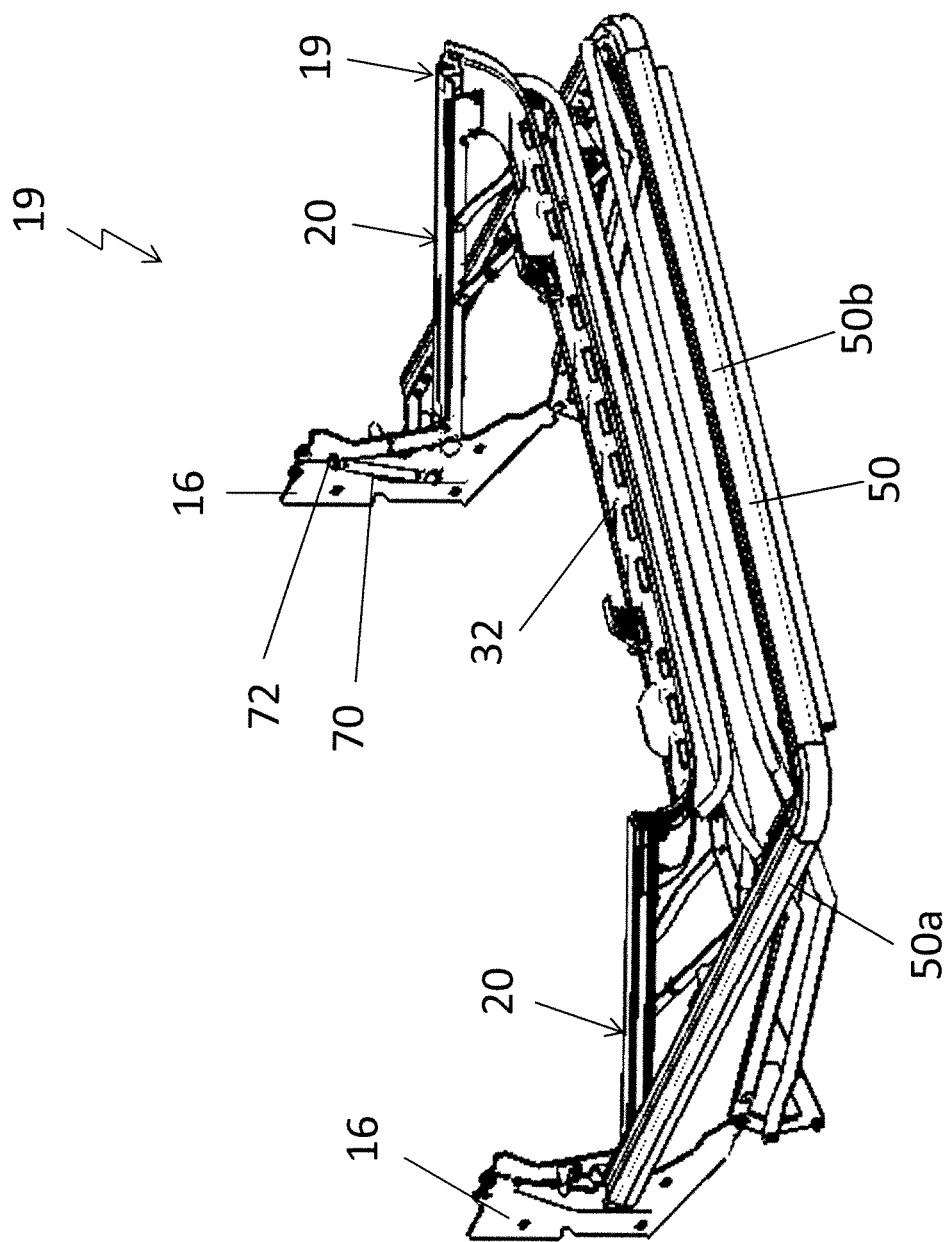
FIG. 4 is a perspective view of the top of FIG. 2 in a storage position.
Figure 5:
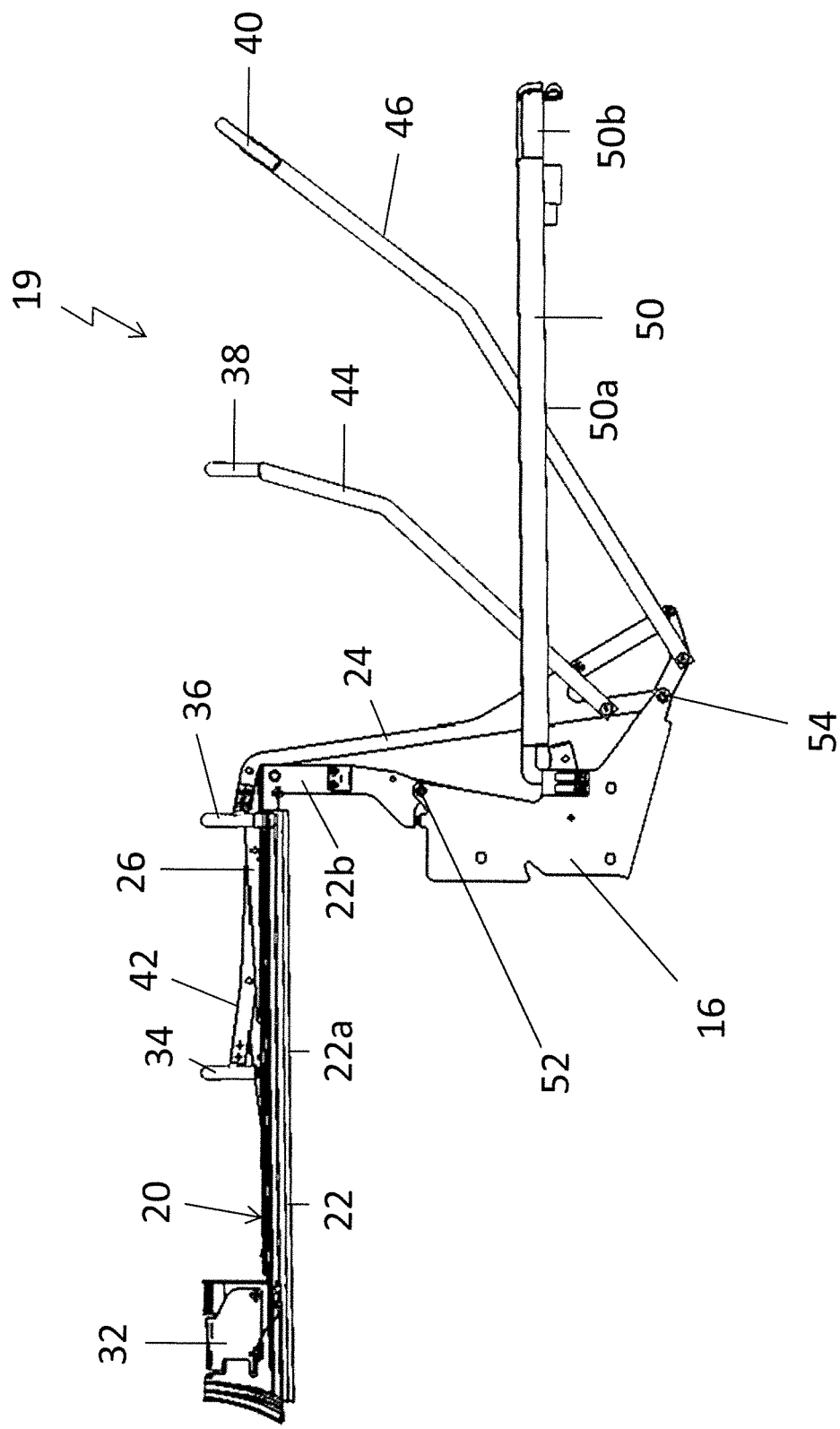
FIG. 5 is a view corresponding to FIG. 2, showing the top without a top cover.
Figure 6:
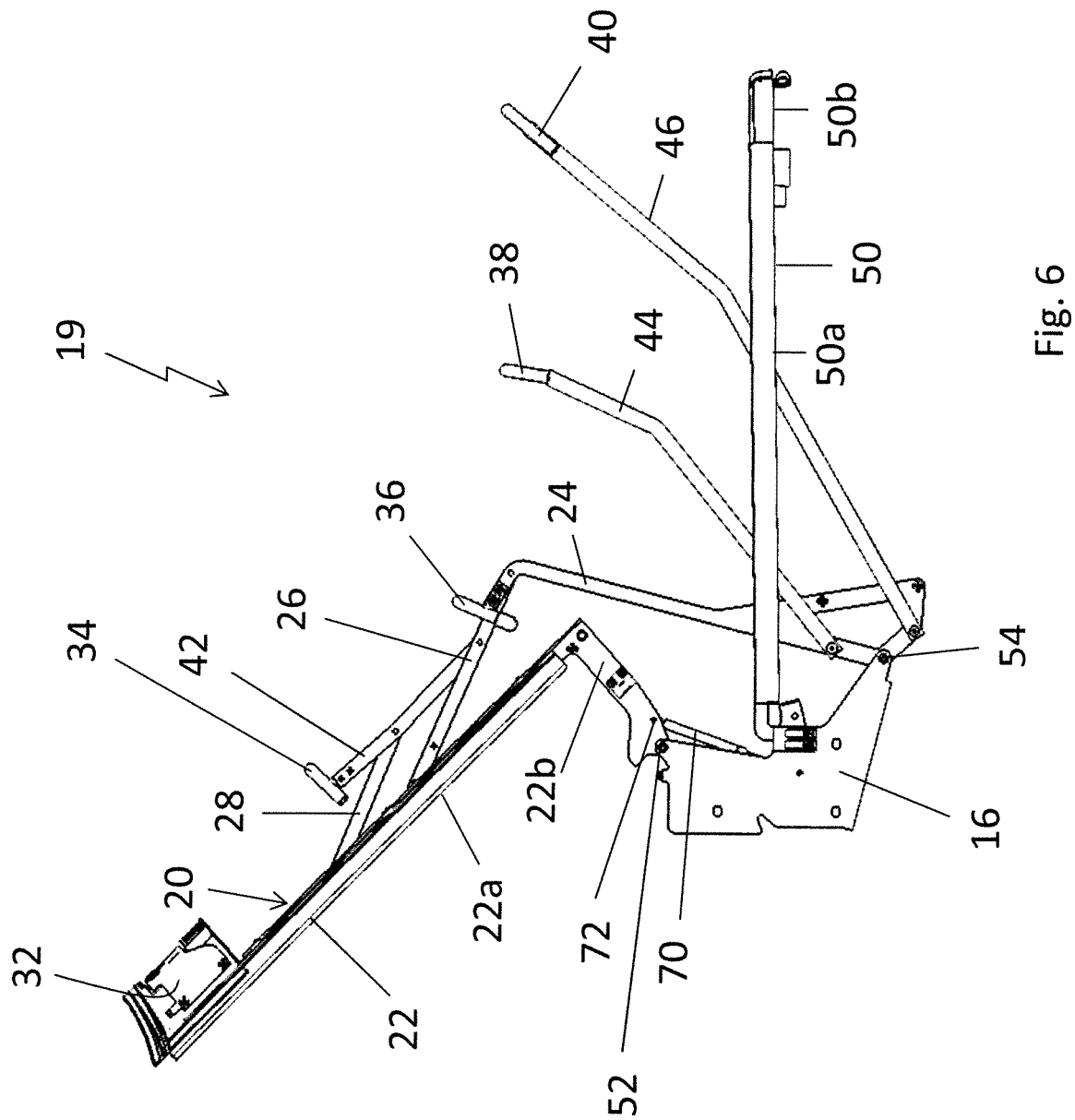
FIG. 6 is a view corresponding to FIG. 5, showing the top in a first intermediate position.
Figure 7:
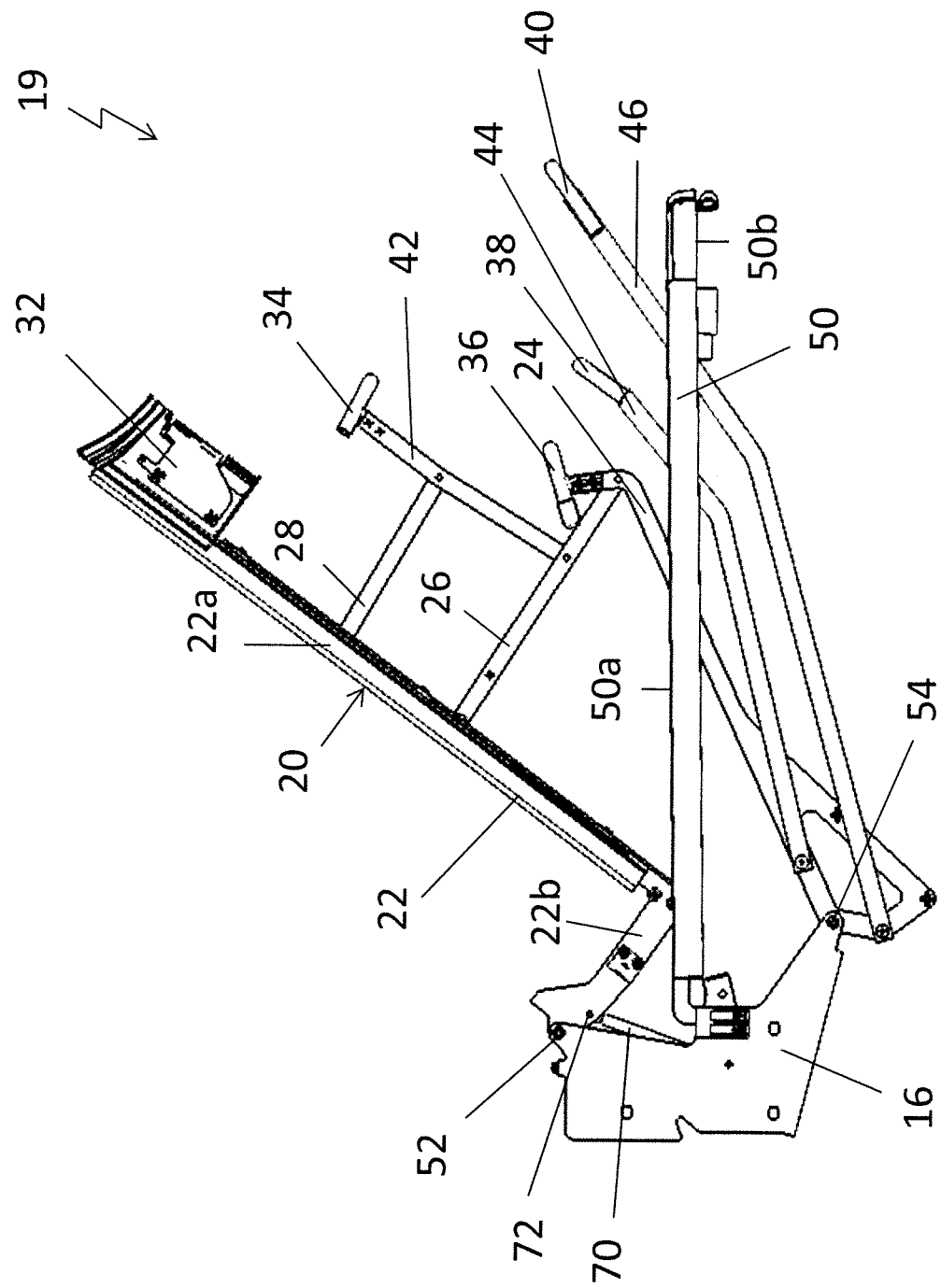
FIG. 7 is a view corresponding to FIG. 5, showing the top in a second intermediate position.
Figure 8:
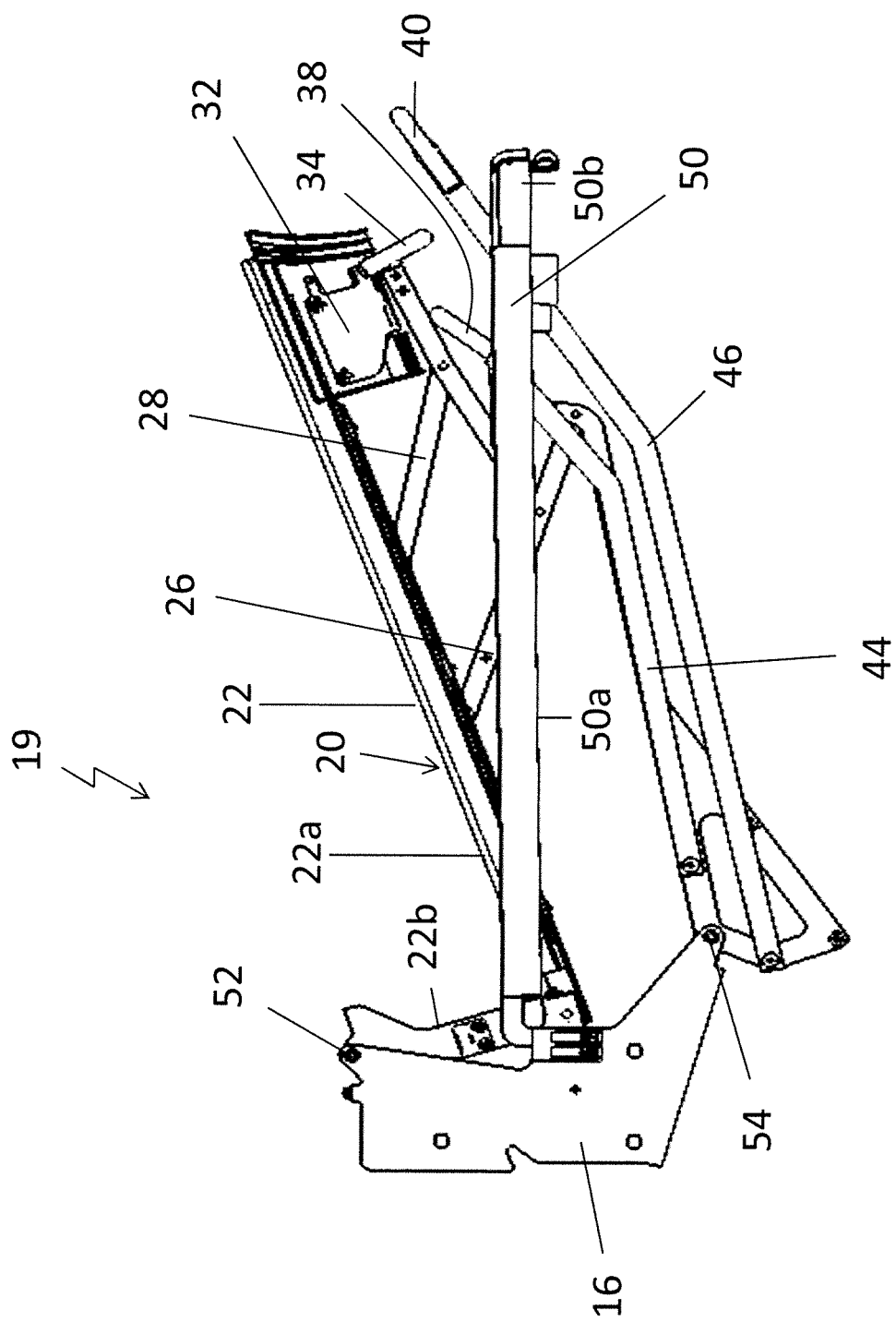
FIG. 8 is a view corresponding to FIG. 5, showing the top in the storage position.
Figure 9:
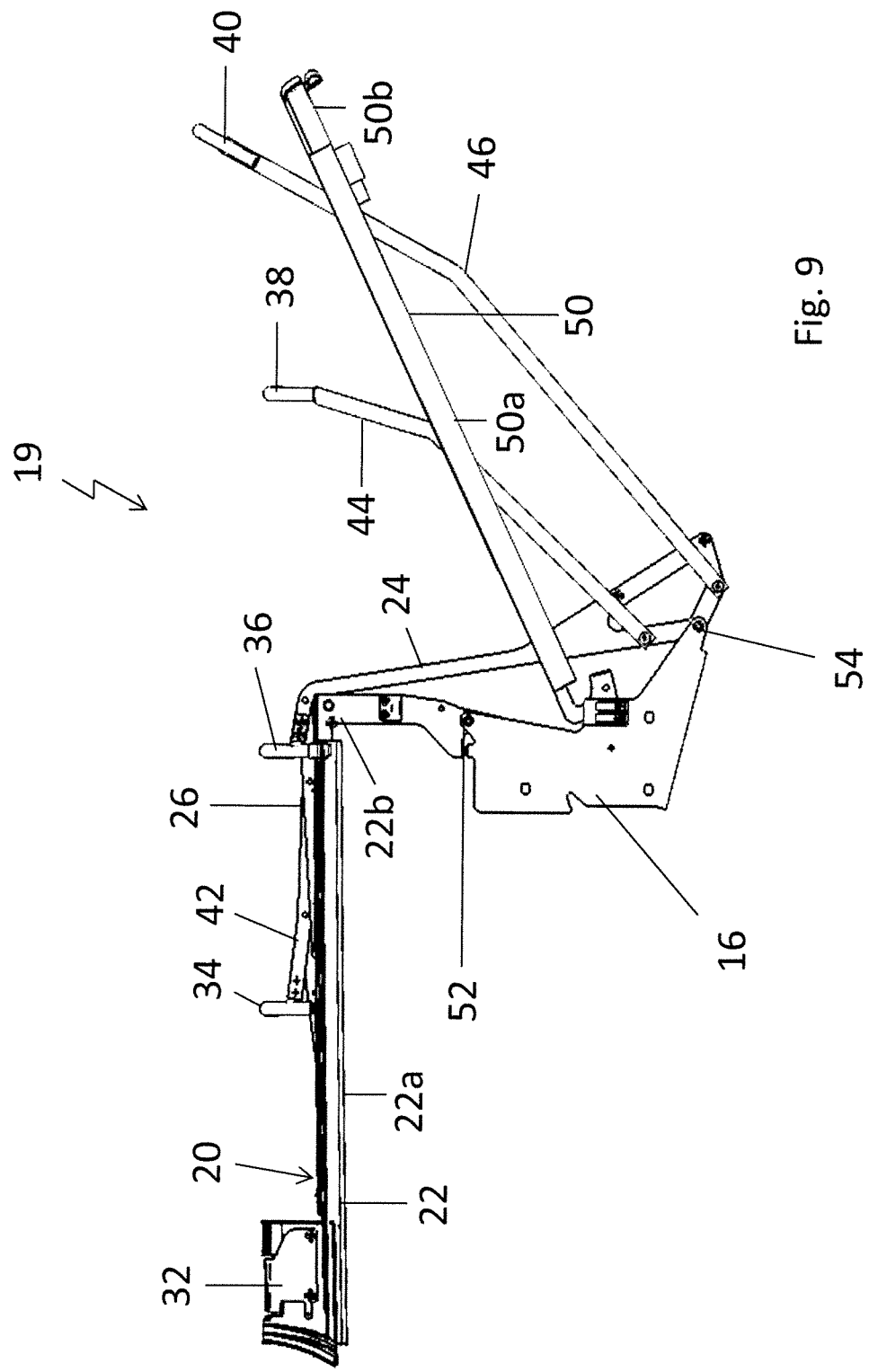
FIG. 9 is a view corresponding to FIG. 5, showing the top in a loading position.
Figure 12:
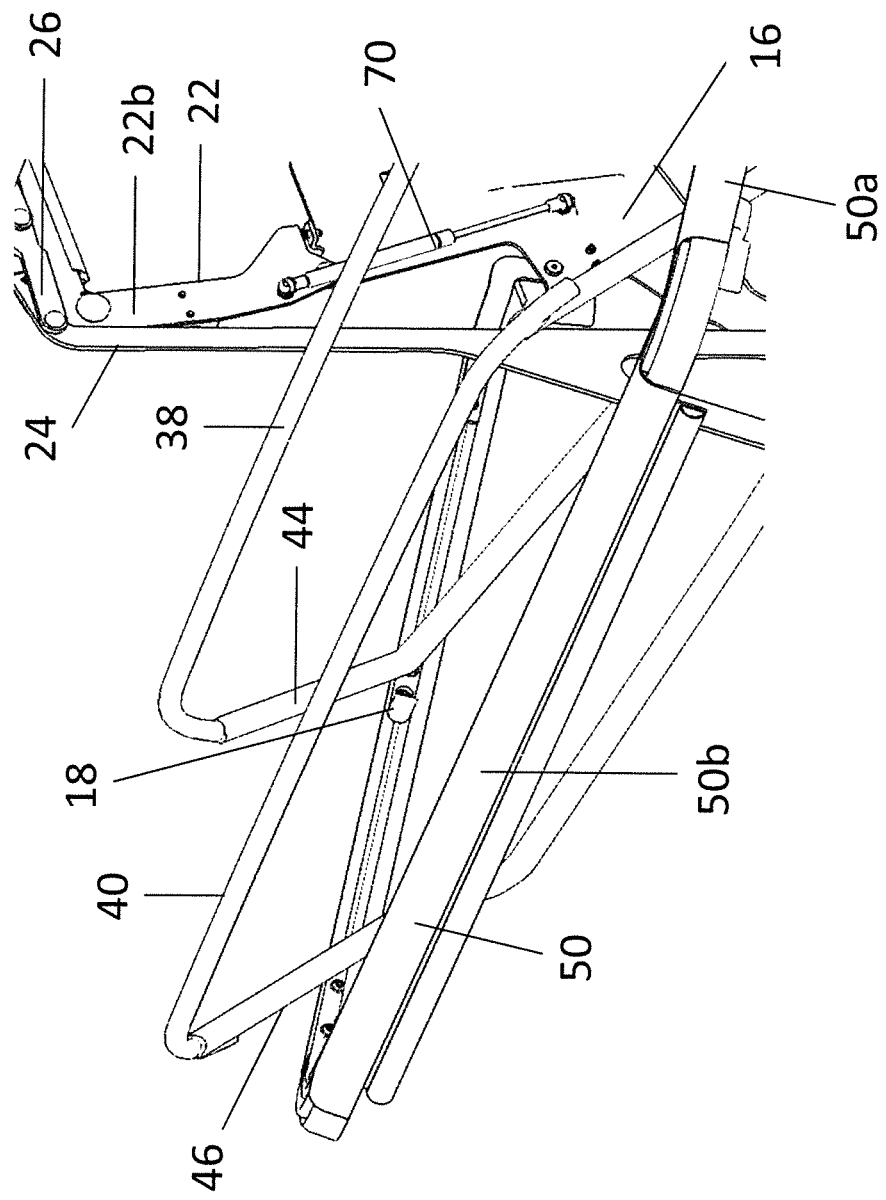
FIG. 12 is a perspective exterior view of a rear portion of the top in the loading position.

Top 12 comprises a top cover 14 which can be displaced by means of a top linkage 19. Top linkage 19 can be displaced between the covering position and a storage position, which is illustrated in FIGS. 4 and 8 and in which the vehicle interior is open at the top and top 12 is stored in a rear storage space of vehicle body 62. Moreover, top 12 can be displaced from the covering position into a loading position, which is illustrated in FIGS. 9 and 12 and in which a cargo space of vehicle 10 is easily accessible.

Top linkage 19 comprises a link assembly 20 on either side of a vertical longitudinal center plane of the top. Link assemblies 20 are mirror-symmetrical with respect to the longitudinal center plane of the vehicle, which is why, for the sake of clarity, only link assembly 20 on the left with respect to the direction of forward travel of vehicle 10 will be explained in detail below.

Link assemblies 20 each comprise a four-bar linkage having a first main link 22, a second main link 24, and a coupling link 26 connecting first main link 22 and second main link 24.

First main link 22 is L-shaped and comprises a long leg 22a and a short leg 22b. In the covering position, long leg 22a extends in the longitudinal direction of the vehicle and short leg 22b extends in the vertical direction of the vehicle, coupling link 26 extending approximately parallel to long leg 22a of first main link 22.

In the covering position, long legs 22a of first main links 22 of link assemblies 20 each form a roof side beam which has a weather strip and whose front end reaches or comes close to front header 64 of convertible vehicle 10. A front bow 32 is rigidly attached in the front end portion of long legs 22a, said front bow 32 extending in the transverse direction of the vehicle between both link assemblies 20 disposed on either side of the vertical longitudinal center plane of the top.

Short leg 22b of main link 22 is pivotably mounted on a respective vehicle-attached main bearing 16 via a hinge point 52. A driving element in the form of a gas pressure spring 70 is articulated to a side of short leg 22b that faces the vehicle interior, said gas pressure spring 70 aiding displacement of top 12. A first end of gas pressure spring 70 engages first main link 22 and the other end is supported on vehicle-attached main bearing 16.

As top 12 is being displaced from the covering position into the storage position, gas pressure springs 70 of both link assemblies 20 at first each aid pivoting of respective first main link 22 in the direction of the vehicle rear until an intermediate position is reached. When first main links 22 are then pivoted further, displacement of top linkage 19 is damped by gas pressure springs 70, allowing the storage position to be reached without top linkage 19 crashing onto the vehicle body.

Second main links 24 of link assemblies 20 are each pivotably mounted on respective vehicle-attached main bearing 16 in a hinge point 54. At their ends located at the top when in the covering position, second main links 24 are each pivotably connected to respective coupling link 26.

Furthermore, top linkage 19 comprises three tube-like transverse bows 34, 36 and 38 and a tube-like corner bow 40, which extend in the transverse direction of the roof and across which top cover 14 is stretched (tensioned) in the covering position. Transverse bows 34, 36 and 38 and corner bow 40 connect mirror-symmetrical link assemblies 20 and are pivotably mounted.

Transverse bow 34 is rigidly attached to a bow link 42 at both sides, said bow link 42 and a respective control link 28 and respective coupling link 26 together forming a four-bar linkage, bow link 42 pivotably connecting control link 28 and coupling link 26. Control link 28 is pivotably mounted on first main link 22 of respective link assembly 20.

Transverse bow 36 is rigidly attached to second main links 24 at both sides, in particular to the ends of second main links 24 located at the top when in the covering position. Transverse bow 38 and corner bow 40 are each rigidly attached to bow links 44 and 46, respectively, and connected to second main links 24 via said bow links 44 and 46.

When top linkage 19 is in the covering position, corner bow 40 defines an area of transition of top cover 14 between a roof portion 68, which extends in the longitudinal direction of the vehicle, and rear portion 66, which extends in the vertical direction of the vehicle.

A tensioning bow 50 is pivotably mounted on vehicle-attached main bearings 16 disposed on either side of the longitudinal center plane of the vehicle. Tensioning bow 50, which surrounds the vehicle interior of vehicle 10 at the rear at the height of a beltline surrounding a cargo space, comprises two legs 50a which extend in the longitudinal direction of the vehicle when in the covering position and via which tensioning bow 50 is pivotably mounted on vehicle-attached main bearings 16. Both legs 50a are connected via a transverse beam 50b, which extends in the transverse direction of the vehicle.

A blocking element 18 is disposed on a side of each leg 50a of tensioning bow 50 that faces the longitudinal center plane of the vehicle. Blocking element 18 is a stop element having a nose-like protrusion and is screwed or riveted to respective leg 50a of tensioning bow 50.

Figure 10:
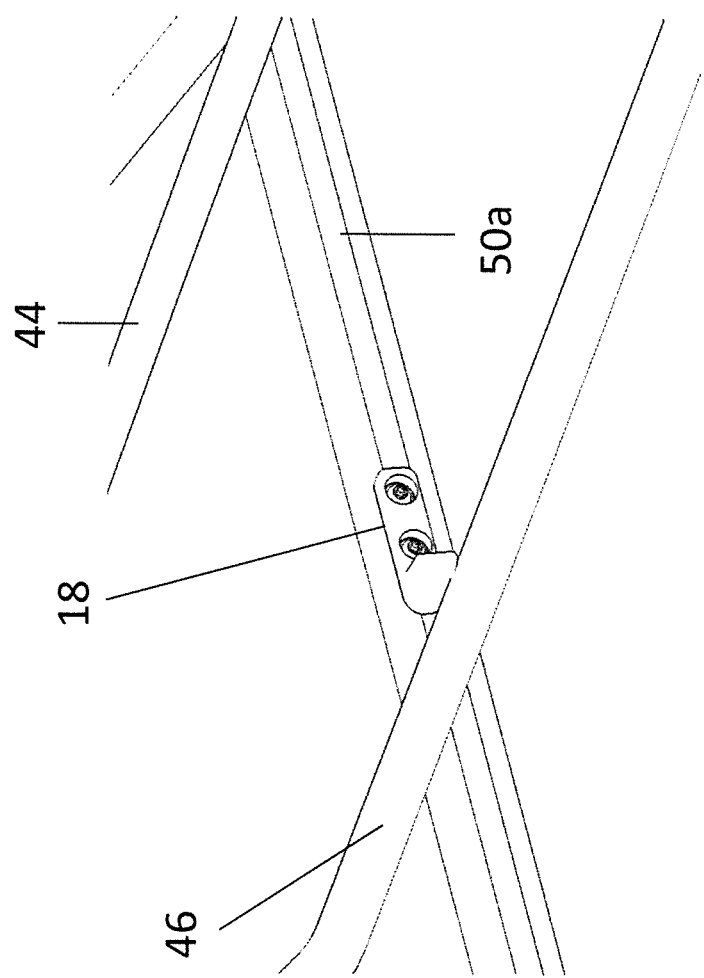
FIG. 10 is a perspective interior view of a rear portion of the top in the covering position.
Figure 11:
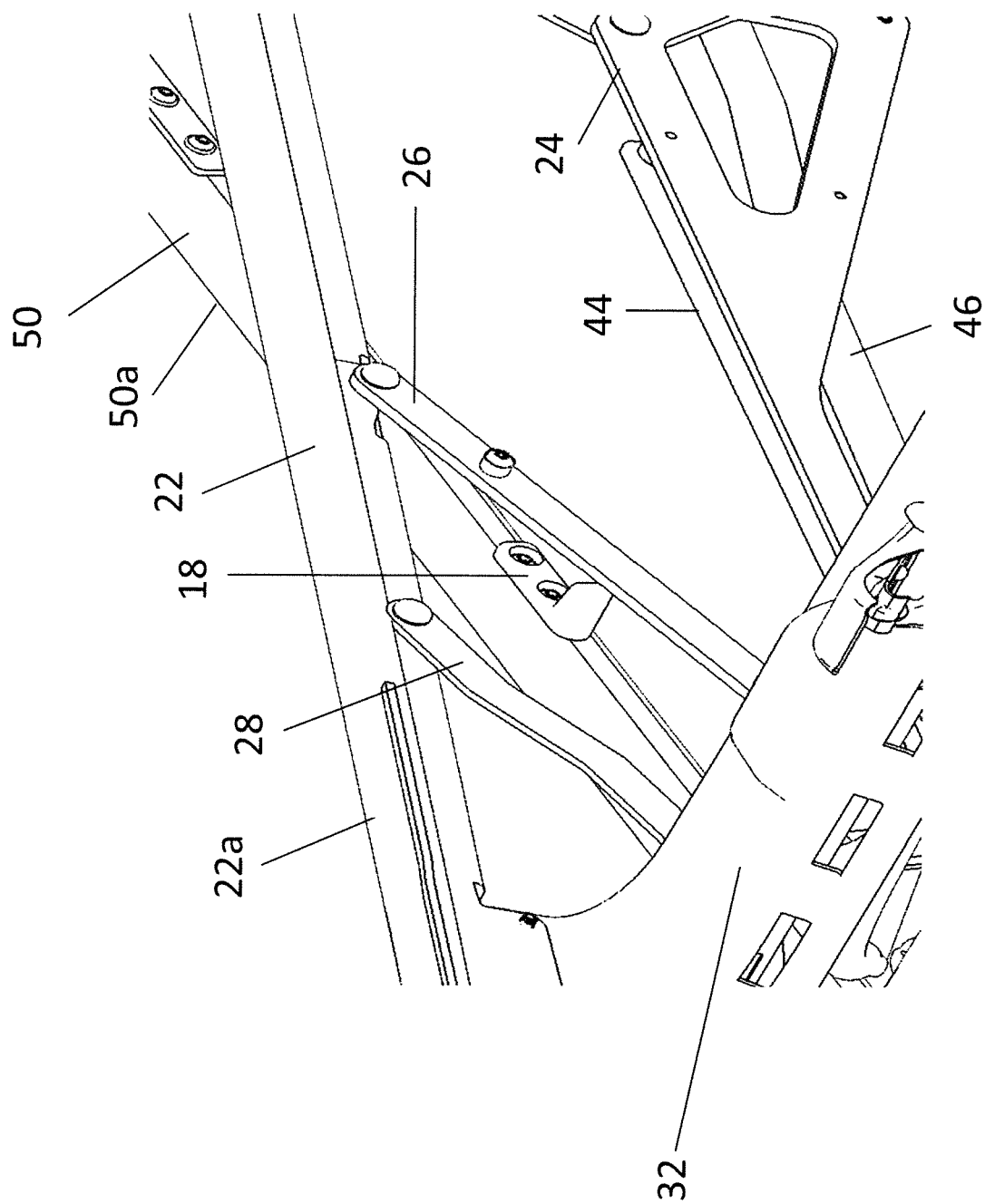
FIG. 11 is a perspective interior view of the rear portion of the top in the storage position.

In FIGS. 10 to 12, the rear area (in the longitudinal direction of the vehicle) of left link assembly 20 (with respect to the forward direction of travel of vehicle 10) is illustrated in detail in different covering positions.

In FIG. 10, top linkage 19 is in its covering position, blocking elements 18 or protrusions of blocking elements 18 disposed on tensioning bow 50 securing bow link 46 against unintentional displacement in the direction of the front of the vehicle and in the vertical direction of the vehicle. Otherwise, unintentional displacement of this kind could be caused by a fabric tension of top cover 14.

When the top is being displaced into the loading position as illustrated in FIGS. 9 and 12, tensioning bow 50 is lifted, causing blocking elements 18 to be removed from bow links 46, thus releasing them, so that bow links 46 and thus corner bow 40 can also be pivoted forward in the direction of the vehicle front. This displacement takes place manually.

REFERENCE SIGNS 10 convertible vehicle
12 top
14 top cover
16 vehicle-attached main bearing
18 blocking element
19 top linkage
20 link assembly
22 first main link
22a long leg
22b short leg
24 second main link
26 coupling link
28 control link
32 front bow
34 transverse bow
36 transverse bow
38 transverse bow
40 corner bow
42 bow link
44 bow link
46 bow link
50 tensioning bow
50a leg
50b transverse beam
52 hinge point
54 hinge point
62 vehicle body
64 front header
66 rear portion
68 roof portion
70 gas pressure spring

The invention claimed is:

1. A top for a convertible vehicle, comprising: a top cover and a top linkage which can be displaced between a covering position, in which a vehicle interior is covered, and a storage position, in which the vehicle interior is open at the top, and which comprises a link assembly on either side of a vertical longitudinal center plane of the top, the top linkage having a corner bow which extends in the transverse direction of the vehicle and which defines an area of transition of the top cover between a roof portion and a rear portion when the top linkage is in the covering position, wherein when the top linkage is in the covering position, the corner bow is secured against pivoting by means of at least one blocking element disposed on a pivoting part of the top linkage and can be displaced from the covering position into a loading position by displacing the pivoting part; and wherein the pivoting part is a tensioning bow which surrounds the vehicle interior at the rear and which is pivotably mounted on a respective vehicle-attached main bearing on either side of a vertical longitudinal center plane of the vehicle.

2. The top according to claim 1, wherein the tensioning bow is secured against pivoting when the top linkage is in the covering position.

3. The top according to claim 1, wherein the tensioning bow has a blocking element on either side of the vertical longitudinal center plane of the vehicle.

4. The top according to claim 1, wherein the blocking element is a stop element.

5. The top according to claim 1, wherein displacement into the loading position takes place manually.

6. A convertible vehicle having a top according to claim 1.

7. The top according to claim 3, wherein each blocking element is disposed on a side of the tensioning bow that faces the vehicle interior.

* * * * *